United States Patent
Amani et al.

(10) Patent No.: US 7,489,902 B2
(45) Date of Patent: Feb. 10, 2009

(54) SYSTEMS AND METHODS FOR FACILITATING SIMULTANEOUS COMMUNICATION OVER MULTIPLE WIRED AND WIRELESS NETWORKS

(75) Inventors: Majid Amani, East Greenwich, RI (US); Murat Dymov, Richmond, RI (US); Robert D. Heon, Warwick, RI (US); Michael L. Lamontagne, Johnston, RI (US); Michel A. Zinni, Jr., Warwick, RI (US); Jeffrey Shlayen, Chestnut Hill, MA (US)

(73) Assignee: ZIH Corp., Hamilton (BM)

( * ) Notice: Subject to any disclaimer, the term of this patent is extended or adjusted under 35 U.S.C. 154(b) by 346 days.

(21) Appl. No.: 11/236,015

(22) Filed: Sep. 27, 2005

(65) Prior Publication Data

US 2006/0072151 A1 Apr. 6, 2006

Related U.S. Application Data

(60) Provisional application No. 60/616,573, filed on Oct. 6, 2004.

(51) Int. Cl.
*H04B 1/00* (2006.01)
(52) U.S. Cl. .......... 455/63.1; 455/414.1; 455/414.4; 455/557; 455/426.1; 455/436; 709/217; 709/227; 710/313; 710/315; 370/352
(58) Field of Classification Search ............ 455/41.2, 455/63.1, 557, 464, 515, 114.2, 414.1, 414.4, 455/436, 426.1; 370/338, 341
See application file for complete search history.

(56) References Cited

U.S. PATENT DOCUMENTS

| | | | | |
|---|---|---|---|---|
| 5,878,036 A * | 3/1999 | Spartz et al. | ............... | 370/335 |
| 5,978,679 A * | 11/1999 | Agre | .................... | 455/442 |
| 6,959,265 B1 * | 10/2005 | Candela et al. | ............ | 702/186 |
| 7,062,261 B2 * | 6/2006 | Goldstein et al. | ........... | 455/419 |
| 7,127,541 B2 * | 10/2006 | Govindarajulu et al. | ..... | 710/300 |
| 7,136,904 B2 * | 11/2006 | Bartek et al. | ............... | 709/217 |
| 7,194,283 B2 * | 3/2007 | Kardach et al. | ......... | 455/552.1 |
| 7,209,734 B2 * | 4/2007 | Maes | ................... | 455/414.1 |
| 7,305,511 B2 * | 12/2007 | Barrett et al. | .............. | 710/316 |

FOREIGN PATENT DOCUMENTS

| | | |
|---|---|---|
| EP | 1 389 855 A2 | 2/2004 |
| EP | 1 389 855 A3 | 11/2004 |
| WO | WO 2005/083944 A1 | 9/2005 |

* cited by examiner

*Primary Examiner*—Marceau Milord
(74) *Attorney, Agent, or Firm*—Alston & Bird LLP

(57) ABSTRACT

A device is provided that is capable of simultaneous communication over multiple wired and wireless networks. The device is capable of processing data received simultaneously over multiple networks by storing the data in data buffers and using a polling routine to retrieve the data from the data buffers. The device is capable of preventing interference when communicating over multiple wireless networks in the same frequency band by monitoring the frequency channel used by one of the wireless networks and controlling the frequency channels used by the other wireless networks.

17 Claims, 6 Drawing Sheets

SYSTEMS AND METHODS FOR FACILITATING SIMULTANEOUS COMMUNICATION OVER MULTIPLE WIRED AND WIRELESS NETWORKS

CROSS-REFERENCE TO RELATED APPLICATIONS

This application claims the benefit of U.S. Provisional Application No. 60/616,573, filed Oct. 6, 2004, which is incorporated by reference herein in its entirety.

FIELD OF THE INVENTION

The present invention relates generally to devices capable of communicating over networks, and more particularly, to devices that are capable of communicating simultaneously over multiple networks, both wired and wireless.

BACKGROUND OF THE INVENTION

Devices communicate or exchange data with other devices using a number of different communication interfaces. Hard-wired communication interfaces include serial and universal serial bus (USB). Wireless communication interfaces include Bluetooth, wireless Ethernet (also called WiFi or 802.11b), and general packet radio service (GPRS) to name a few.

Bluetooth is a low power wireless personal area network (PAN) intended for short distance communications and intended to be used as a cable replacement. Bluetooth is commonly used for applications such as wireless headsets, wireless synchronization of personal digital assistants (PDAs) with computers, and wireless printers and keyboards.

WiFi is wireless Ethernet local area network (LAN) based on IEEE (Institute of Electrical and Electronics Engineers) standard 802.11b. Both WiFi and Bluetooth operate in the 2.4 gigahertz (GHz) band. This band is 83.5 megahertz (MHz) wide, beginning at 2.4 GHz and ending at 2.4835 GHz. WiFi only occupies about a quarter of the 83.5 MHz bandwidth that is available in the 2.4 GHz band. 802.11b defines eleven possible channels in the 2.4 GHz band.

In contrast to WiFi, the Bluetooth channel does not utilize a fixed frequency but rather employs frequency hopping. Bluetooth devices hop among seventy-nine defined frequency channels in the 2.4 GHz band. In this way, Bluetooth occupies the entire 2.4 GHz band but, at any instant in time, only occupies a small portion of the band. Bluetooth hops to a new channel in the 2.4 GHz band about 1,600 times a second.

GPRS is a packet-based wireless communication service which operates on cellular telephone networks.

Some devices use only one communication interface. This one interface may be one of the hard-wired interfaces listed above or may be one of the wireless interfaces listed above. Devices that use only one communication interface can therefore only communicate with other devices using that same interface. As the number of communications interfaces increases, it is less likely that a device with only one communication interface will be able to communicate with other devices.

To address the problems associated with devices having only one communication interface, some devices now include two or more communication interfaces. While these devices with two or more communication interfaces are able to communicate with a larger number of other devices, the existence of multiple communication interfaces in the same device creates other problems. A device with two or more communication interfaces may receive data through more than one interface simultaneously and must be able to process any data that is simultaneously received through more than one interface.

Additionally, the close proximity of transmitters for the multiple wireless communication interfaces can cause interference when two or more transmitters are transmitting simultaneously. This interference problem is especially acute when the multiple wireless communication interfaces utilize the same communication frequency band. For example, as discussed above, Bluetooth and WiFi both communicate in the 2.4 GHz band. If a device is sending data via a WiFi interface at a certain frequency in the 2.4 GHz band and the device also attempts to simultaneously send data via a Bluetooth interface, it is possible the Bluetooth interface may hop to the same frequency that the WiFi interface is using and transmit at that frequency. This resulting interference will cause the WiFi interface to abort sending its data. After aborting its attempt to send data, the WiFi interface will then reattempt sending its data at a lower data rate. As a result, communication speeds decrease and network performance is degraded.

Bluetooth version 1.2 addresses the issue of interference with WiFi using a technique called adaptive frequency hopping. Adaptive frequency hopping changes the channel map used by Bluetooth when it senses data collisions. However, this method does not prevent collisions but rather responds to collisions. Therefore this technique also results in decreased communication speeds.

As such, there is a need for a device that is capable of simultaneous communication over multiple wired and wireless networks, such that the device is capable of processing data received simultaneously over multiple networks and such that the device is capable of preventing interference when communicating over multiple wireless networks in the same frequency band.

BRIEF SUMMARY OF THE INVENTION

A device is therefore provided that is capable of simultaneous communication over multiple wired and wireless networks, such that the device is capable of processing data received simultaneously over multiple networks and such that the device is capable of preventing interference when communicating over multiple wireless networks in the same frequency band.

According to one embodiment of the present invention, the device has a combination of wired and wireless communication interfaces. Each communication interface has a respective software driver to transmit and receive data over each respective communication interface. Each software driver is interrupt driven such that it will immediately receive data that comes in over each respective communication interface. Each software driver has a software data buffer such that it temporarily stores the data it receives over the communication interface. Through the use of these independent software drivers the device is capable of receiving data simultaneously over multiple communication interfaces.

The device has a main processor that retrieves the data from each of the software data buffers such that the data can be processed further. For example, in one embodiment of the invention the device is a portable printer. When the data that has been received over the communication interfaces has been retrieved by the main processor, the main processor then formats the data for printing and outputs the data to the printer's printing mechanism.

The main processor retrieves the data from the software data buffers by using a polling routine. The main processor polls each software data buffer one at a time in a round-robin manner. Any data that is temporarily stored in the software data buffers is thereby retrieved by the main processor, one data buffer at a time, thereby allowing the main processor to effectively process the data.

It should be appreciated that the device may have two or more communication interfaces and that these communication interfaces may be wired, wireless, or any combination of wired and wireless. The communication interfaces may be selected from the group comprising serial, USB, Bluetooth, WiFi, and GPRS. This group of communication interfaces is intended to be illustrative and is not intended to be limiting. It should be appreciated that this device may have any type of communication interface known, and in any combination.

According to another embodiment of the present invention, the device has two wireless communication interfaces each operating at various frequency channels in the same frequency band. These various frequency channels utilized by each communication interface are collectively referred to as a channel map, with each communication interface having a respective channel map. Each of the wireless communication interfaces has a software driver to transmit and receive data over each respective wireless communication interface, using any of the channels in its respective channel map. In addition to the drivers for each communication interface, there is a master driver, called a ringleader, which communicates with and exercises control over the other drivers. The ringleader periodically determines which frequency channel the first communication interface is using and temporarily removes that channel from the channel map of the second communication interface, thereby preventing the two communication interfaces from using the same frequency channel and preventing interference. The periodic determination by the ringleader of which frequency channel is being used by the first communication interface is performed frequently, for example every twenty milliseconds. Each time this periodic determination is made, the ringleader adjusts the channel map of the second communication interface to exclude the channel being used by the first communication interface.

In an example of this embodiment, the first communication interface is a WiFi interface and the second communication interface is a Bluetooth interface. It should be appreciated that this device is not limited to devices with Bluetooth and WiFi communication interfaces, nor is it limited to only two wireless communication interfaces, but may have any two or more communication interfaces that utilize the same frequency band.

The present invention provides a device that is capable of simultaneous communication over multiple wired and wireless networks. The device is capable of processing data received simultaneously over multiple networks. The device is also capable of eliminating interference when communicating over multiple wireless networks in the same frequency band.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the present invention described herein provide for the device to be a portable printer. However, it should be appreciated that other embodiments of the present invention may be utilized in conjunction with alternative devices that communicate over wired and/or wireless networks, such as desktop computers, laptop computers, mobile computers, personal digital assistants, and card readers. Accordingly, the present invention is not limited to portable printers, but rather includes any device that communicates over wired and/or wireless networks.

The portable printer of one embodiment of the present invention may have any combination of wireless and hardwired communication interfaces. The printer may communicate with any device capable of communicating over a wireless or hardwired network. For example, the printer may receive data from a desktop computer via a USB interface, it may receive data from a mobile computer via a WiFi interface, and it may receive data from a PDA via a Bluetooth interface. The printer may also respond to the aforementioned devices over the same interfaces, or it may relay data to other devices, such as other printers, over the same interfaces or other interfaces.

Figure 1:
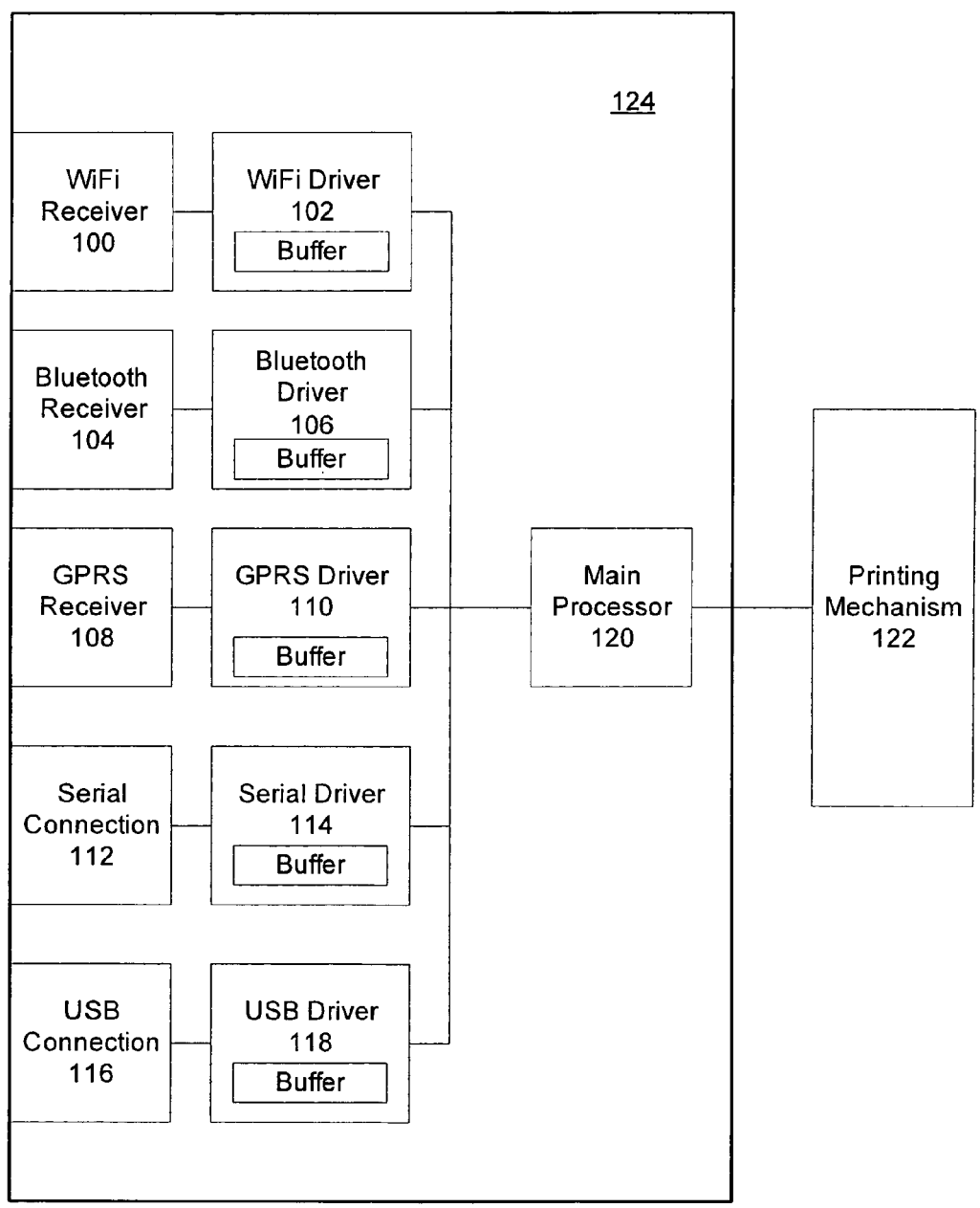
FIG. 1 is a schematic of a main circuit board of one embodiment of the present invention.

FIG. 1 depicts a schematic of a main circuit board of a portable printer according to one embodiment of the present invention. In this embodiment, the main circuit board 124 has three wireless communication interfaces 100, 104, and 106. Wireless communication interface 100 is a WiFi receiver to receive signals from a wireless Ethernet LAN. Wireless communication interface 104 is a Bluetooth receiver to receive signals from a wireless PAN. Wireless communication interface 108 is a GPRS receiver to receive signals from a cellular telephone network. In addition to the wireless communication interfaces, main circuit board 124 has two hard wired communication interfaces 112 and 116. Hard wired communication interface 112 is a serial connection, and hard wired communication interface 116 is a USB connection. Data received by each of the communication interfaces 100, 104, 108, 112, and 116 is controlled by a corresponding driver 102, 106, 110, 114, and 118. Each of the drivers includes a software data buffer as shown in FIG. 1. As each driver receives data from its respective communication interface, the data is stored in each driver's data buffer until the data is retrieved from the buffers by the main processor 120. The main processor 120 then formats the data for printing and outputs the data to the printing mechanism 122 to print the data.

Figure 2:
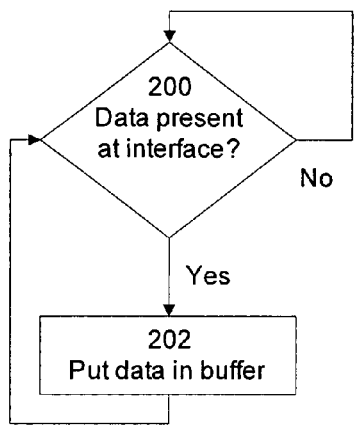
FIG. 2 is a flow chart of operation of the interrupt mechanism of the driver of one of the communication interfaces.

FIG. 2 depicts a flow chart of the operation of the interrupt mechanism of the drivers 102, 106, 110, 114 and 118 from FIG. 1. The drivers are interrupt driven, meaning that as soon as data is present at any one of the communication interfaces, as determined at step 200, the corresponding driver retrieves the information and temporarily stores it in a software data buffer, as indicated in step 202. The data remains in one of the data buffers until it is retrieved by the main processor using the method illustrated in FIG. 3.

Figure 3:
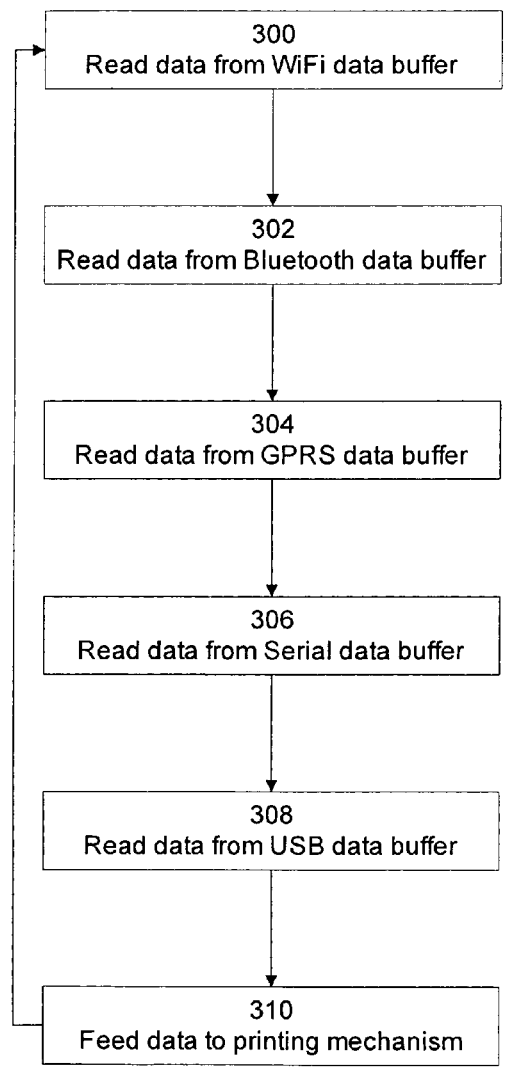
FIG. 3 is a flow chart of operation of the polling mechanism by which the main processor retrieves data from the software data buffers.

FIG. 3 is a flow chart of the operation of the polling mechanism by which the main processor retrieves data from the software data buffers. As discussed above, the data received by the communication interfaces is temporarily stored in data buffers. The main processor polls each software data buffer one at a time in a round-robin manner. In one embodiment of the invention illustrated in FIG. 3, the main processor first checks the WiFi data buffer and reads any data stored in that buffer, as indicated in step 300. The main processor then checks the Bluetooth data buffer in step 302, the GPRS data buffer in step 304, the serial data buffer in step 306, and the USB data buffer in step 308. Once the main processor has polled all the data buffers and retrieved all the data, the main processor then feeds the data to the printing mechanism to be printed, as indicated in step 310.

Figure 4:
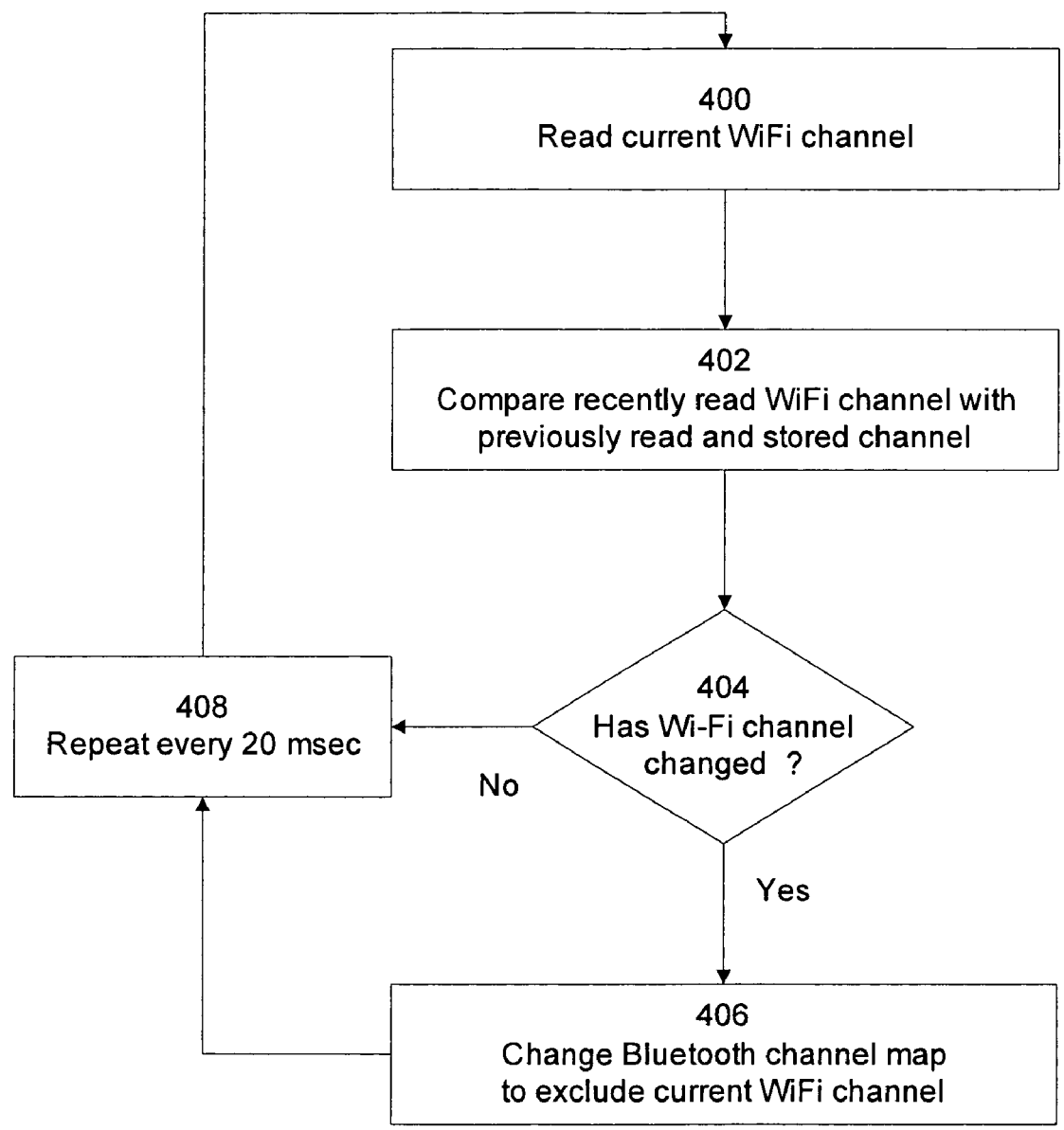
FIG. 4 is a flow chart of operation of the ringleader by which is controls the frequency channels to avoid interference.

FIG. 4 is a flow chart of the operation of the ringleader by which it controls the frequency channels to avoid interference. As discussed above, the ringleader is a master driver which communicates with and controls other drivers. In one embodiment of the invention, the portable printer has both Bluetooth and WiFi wireless communication interfaces. In this embodiment, the ringleader communicates with the WiFi driver to determine on which frequency channel the WiFi communication interface is communicating, as indicated in step 400. The ringleader compares this frequency channel to the WiFi frequency channel previously read and stored by the ringleader, as indicated in step 402. In step 404, the ringleader determines if the WiFi frequency channel has changed from the previously read channel. If the WiFi frequency channel has changed, the ringleader communicates with the Bluetooth driver and changes the Bluetooth channel map to exclude the current WiFi channel, as indicated in step 406. In this embodiment, the Bluetooth driver may be version 1.2 which allows the Bluetooth channel map to be changed. By excluding the current WiFi channel from the Bluetooth frequency map, this prevents the Bluetooth communication interface from using the same channel, thereby preventing interference. Whether or not the Bluetooth channel map is changed, the ringleader repeats this process frequently, every twenty milliseconds in this embodiment as shown in step 408.

Figure 5:
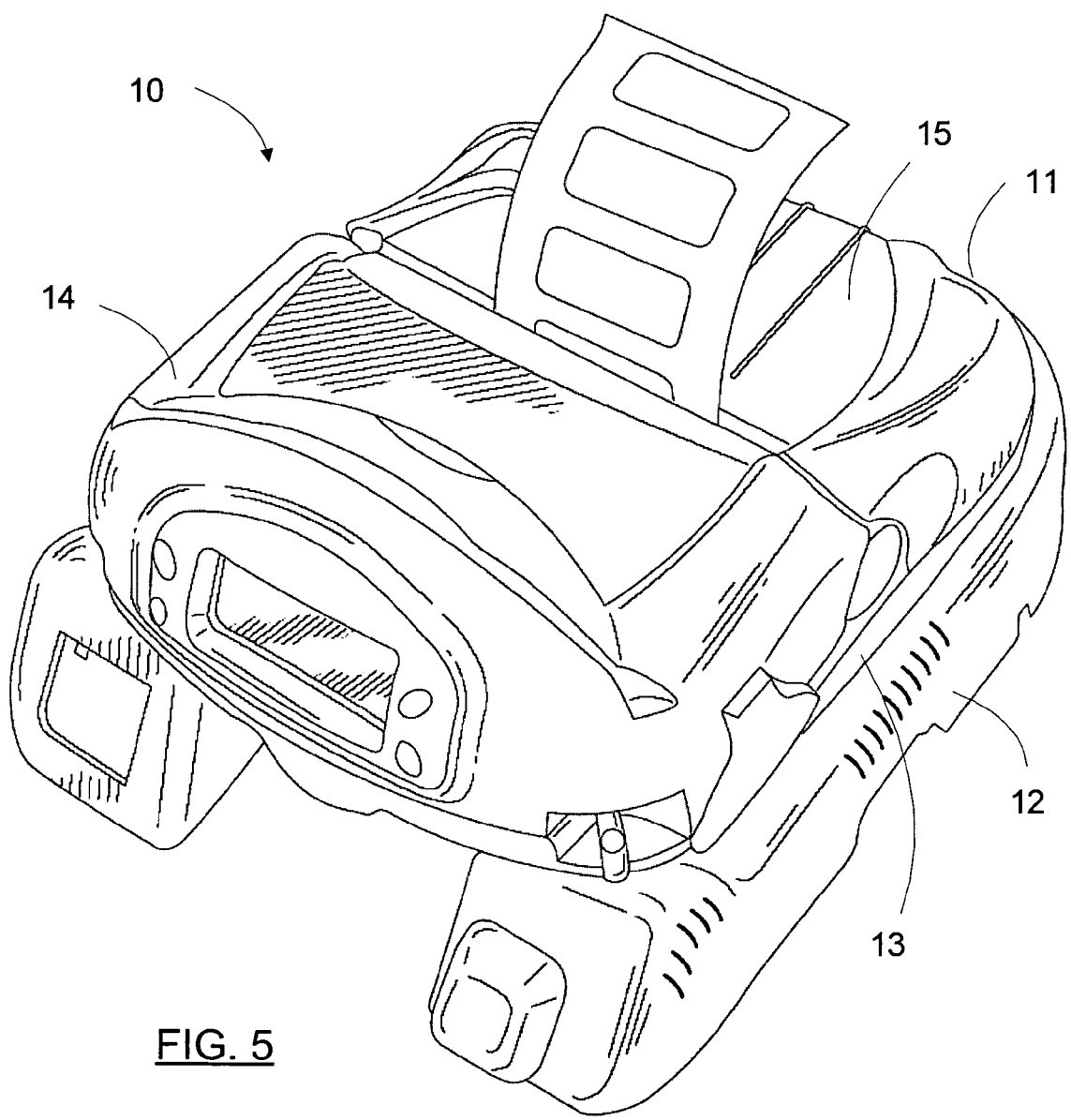
FIG. 5 is a perspective view of one embodiment of the present invention, wherein the device is a portable printer.
Figure 6:
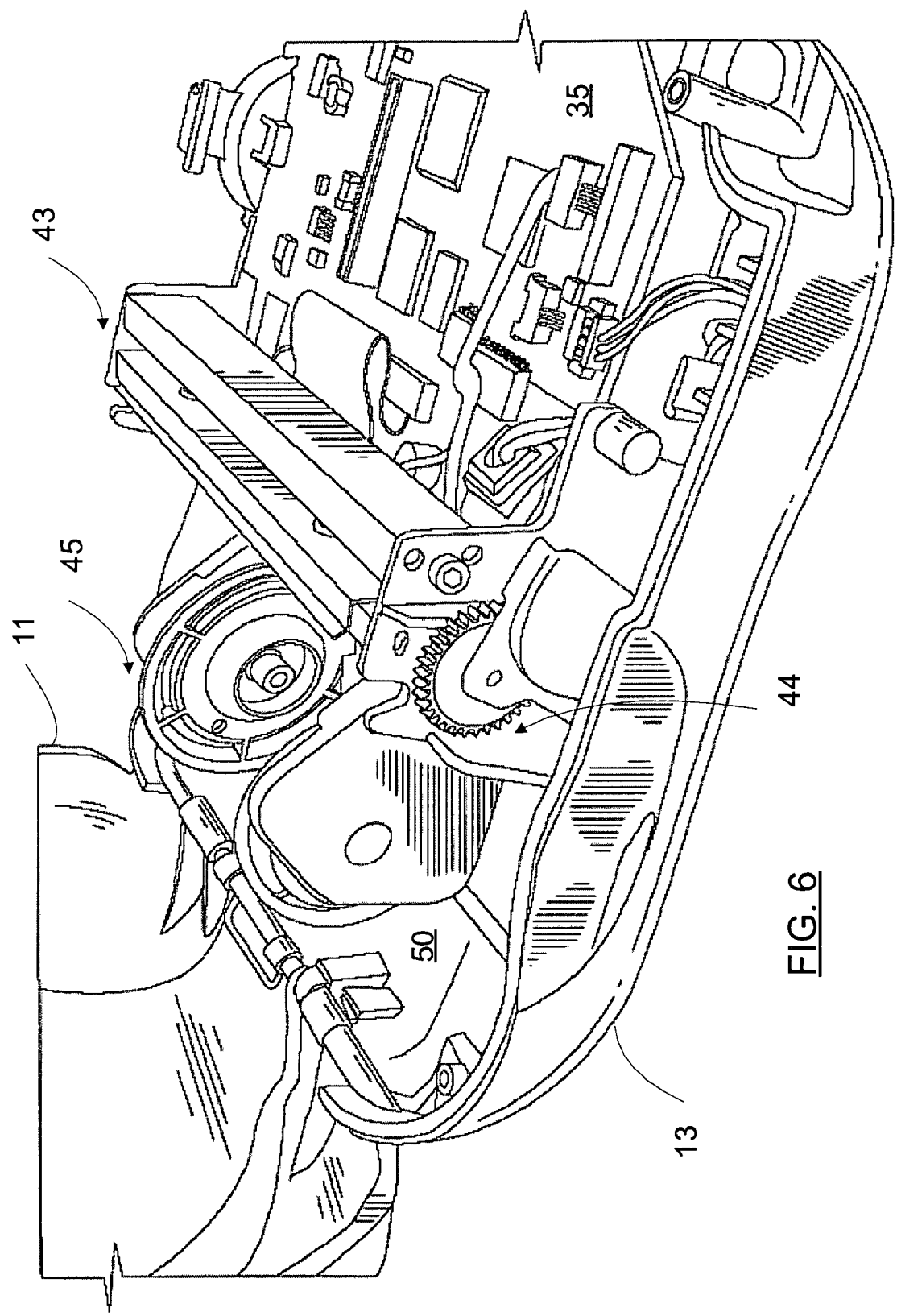
FIG. 6 is a perspective view of the contents of a base portion of the printer of FIG. 5.
Figure 7:
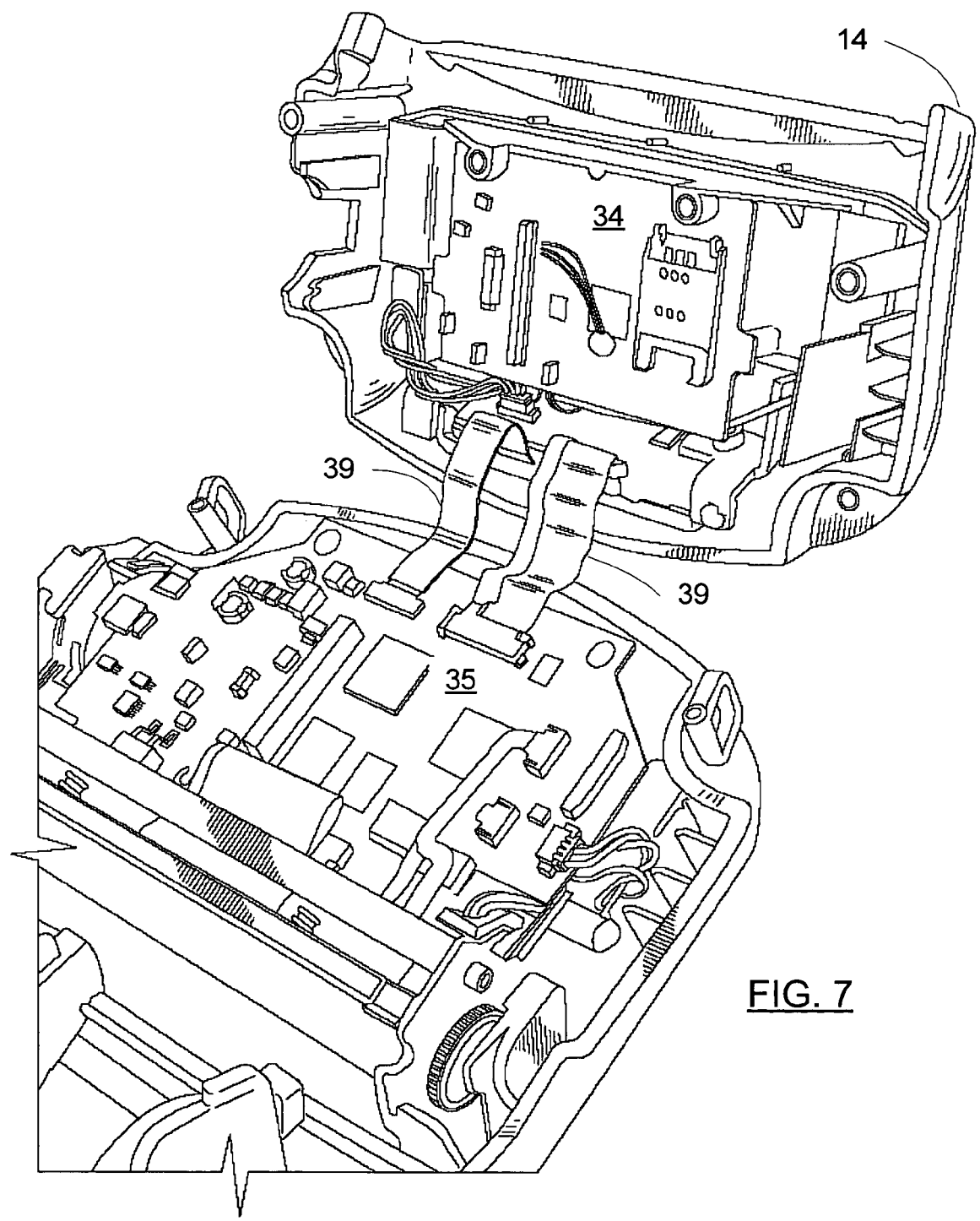
FIG. 7 is a perspective view of the contents of a base portion of the printer of FIG. 5 illustrating the modular circuit board.

FIGS. 5-7 depict a portable printer of another embodiment of the present invention. This printer includes a core printer assembly which includes a modular assembly of additional electronic devices that supplement the core printer operation, such as different communication interfaces. In particular, the core printer includes a main circuit board that is configured to connect to, and communicate with, a modular circuit board that is configured to support the additional communication interfaces. In this manner, multiple types of modular circuit boards, each supporting a different number and combination of communication interfaces, such as WiFi, Bluetooth, GPRS, serial, and USB, can all be employed on the same printer. For example, one modular circuit board may have WiFi and Bluetooth interfaces. Another modular circuit board may have WiFi, Bluetooth, and USB interfaces. Another modular circuit board may have WiFi, Bluetooth, GPRS, serial, and USB interfaces. By use of the modular circuit board, the numbers and types of communication interfaces on a portable printer can be easily customized.

Various aspects of the printer illustrated in FIGS. 5-7 are described in greater detail in the following patent application which is hereby incorporated herein in its entirety by reference: U.S. Provisional Application No. 60/592,110 to Klein, et al., filed on Jul. 29, 2004 and entitled INTERCHANGEABLE MODULE FOR A PORTABLE PRINTER AND SYSTEM FOR OPERATING THE SAME.

A handheld printer 10 of one embodiment of the present invention is shown in FIGS. 5-7. Generally, the printer includes a rounded, rectangular housing 11 that can be supported within a cradle 12, as shown in FIG. 5. The housing has three main sub-portions, including a base 13, a modular component cover 14 and a media supply lid or cover 15.

Referring now to FIG. 6, the base 13 of the housing 11 supports a main circuit board 35, a print head assembly 43, a drive assembly 44, and a media support assembly 45. The print head assembly 43, the drive assembly 44, and the media support assembly 45 are each mounted on a frame 50. In this embodiment, the printer main processor would be mounted on the main circuit board 35, but the various communication interfaces would not.

Referring now to FIG. 7, the modular circuit board 34 is shown in the modular component cover 14 of the printer housing. The modular circuit board 34 is connected to the main circuit board 35 via ribbon connectors 39. In this embodiment and as discussed above, various communication interfaces, such as WiFi, Bluetooth, GPRS, serial, and USB, may be incorporated into the modular circuit board 34. The portable printer may be customized by selecting a modular circuit board 34 which incorporates the number and type of communication interfaces desired.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A device for communicating over at least two wireless communication interfaces comprising:
   a first communication interface configured to operate at one of a plurality of frequency channels within a frequency band;
   a second communication interface configured to operate at one of the plurality of frequency channels within the frequency band; and
   a communication controller configured to determine at which one of the plurality of frequency channels the first communication interface is configured to operate, exclude the frequency channel at which the first communication interface is configured to operate from the frequency channels of the frequency band that are available at which the second communication interface is to be configured to operate, and direct the second communication interface to operate at a different one of the frequency channels of the frequency band other than the frequency channel of the frequency band at which the first communication interface is configured to operate.

2. The device of claim 1 wherein the first communication interface and the second communication interface are chosen from the group comprising wireless Ethernet, Bluetooth, and general packet radio service.

3. The device of claim 1 wherein the first communication interface is wireless Ethernet and the second communication interface is Bluetooth.

4. The device of claim 1 wherein the frequency band is 2.4 GHz.

5. The device of claim 1 wherein the device is a portable printer.

6. The device of claim 1, wherein the communication controller performs the step of excluding the one of the plurality of frequency channels at which the first communication interface is configured to operate from the frequency channels available to the second communication interface for only so long as the first communication interface is operating at the one of the plurality of frequency channels.

7. A device for communicating over at least two communication interfaces comprising:
  a first communication interface having a first communication driver and a first data buffer such that the first communication driver is configured to retrieve first data from the first communication interface and store the first data in the first data buffer;
  a second communication interface having a second communication driver and a second data buffer such that the second communication driver is configured to retrieve second data from the second communication interface and store the second data in the second data buffer; and
  a main processor configured to retrieve data by polling the first and second data buffers and process the data, such that the main processor is configured to retrieve first data from the first data buffer, then retrieve second data from the second data buffer, and then process the first and second data.

8. The device of claim 7 wherein the first communication interface and the second communication interface are chosen from the group comprising wireless Ethernet, Bluetooth, general packet radio service, serial, and universal serial bus.

9. The device of claim 7 wherein the device is a portable printer.

10. The device of claim 7, wherein the first communication driver and the second communication driver are each interrupt driven.

11. The device of claim 7, wherein the first communication driver immediately retrieves the first data upon receipt at the first communication interface and stores the first data in the first data buffer and wherein the second communication driver immediately retrieves the second data upon receipt at the second communication interface and stores the second data in the second data buffer.

12. A printer comprising:
  a housing including a core printer assembly wherein the core printer assembly includes a media support assembly, a drive assembly, and a print head assembly; and
  a communication interface, wherein the communication interface is configured to provide functional support for a plurality of wireless communication devices selected from the group consisting of a wireless Ethernet device, a Bluetooth device, and a general packet radio service device,
  wherein the plurality of wireless communication devices comprises a first wireless communication device and a second wireless communication device, and wherein the printer further comprises a first communication driver and a first data buffer such that the first communication driver is configured to retrieve first data from the first wireless communication device and store the first data in the first data buffer, and wherein the printer further comprises a second communication driver and a second data buffer such that the second communication driver is configured to retrieve second data from the second wireless communication device and store the second data in the second data buffer, and wherein the printer further comprises a main processor configured to retrieve data by polling the first and second data buffers and process the data, such that the main processor is configured to retrieve first data from the first data buffer, then retrieve second data from the second data buffer, and then process the first and second data.

13. A printer comprising:
  a housing including a core printer assembly wherein the core printer assembly includes a media support assembly, a drive assembly, and a print head assembly; and
  a communication interface, wherein the communication interface is configured to provide functional support for a plurality of wireless communication devices selected from the group consisting of a wireless Ethernet device, a Bluetooth device, and a general packet radio service device,
  wherein the plurality of wireless communication devices comprises a first wireless communication device and a second wireless communication device, and wherein the printer further comprises a communication controller configured to determine which one of a plurality of frequency channels within a frequency band the first wireless communication device is configured to operate, exclude the frequency channel at which the first wireless communication device is configured to operate from the frequency channels of the frequency band that are available at which the second wireless communication device is to be configured to operate, and direct the second wireless communication device to operate at a different one of the frequency channels within the frequency band other than the frequency channel of the frequency band at which the first wireless communication device is configured to operate.

14. The printer of claim 13, wherein the first wireless communication device is a wireless Ethernet device and the second wireless communication device is a Bluetooth device.

15. The printer of claim 13, wherein the frequency band is 2.4 GHz.

16. The printer of claim 13, wherein the communication interface is further configured to provide functional support for a plurality of wired communication devices selected from the group consisting of a serial device and a universal serial bus device.

17. A device comprising:
  a communication interface, wherein the communication interface is configured to provide functional support for a plurality of wireless communication devices selected from the group consisting of a wireless Ethernet device, a Bluetooth device, and a general packet radio service device,
  wherein the plurality of wireless communication devices comprises a first wireless communication device and a second wireless communication device, and wherein the printer further comprises a first communication driver and a first data buffer such that the first communication driver is configured to retrieve first data from the first wireless communication device and store the first data in the first data buffer, and wherein the printer further comprises a second communication driver and a second data buffer such that the second communication driver is configured to retrieve second data from the second wireless communication device and store the second data in the second data buffer, and wherein the printer further comprises a main processor configured to retrieve data by polling the first and second data buffers and process the data, such that the main processor is configured to retrieve first data from the first data buffer, then retrieve second data from the second data buffer, and then process the first and second data.

* * * * *

UNITED STATES PATENT AND TRADEMARK OFFICE
CERTIFICATE OF CORRECTION

PATENT NO.       : 7,489,902 B2                                              Page 1 of 1
APPLICATION NO.  : 11/236015
DATED            : February 10, 2009
INVENTOR(S)      : Amani et al.

It is certified that error appears in the above-identified patent and that said Letters Patent is hereby corrected as shown below:

On Title page,

Item (75), Inventors, "Michel A. Zinni, Jr." should read --Michael A. Zinni, Jr.--.

Signed and Sealed this

Fifth Day of May, 2009

JOHN DOLL
*Acting Director of the United States Patent and Trademark Office*